United States Patent [19]
Barth

[11] Patent Number: 4,516,893
[45] Date of Patent: May 14, 1985

[54] SHEET METAL SCREW

[75] Inventor: Gerald D. Barth, South Elgin, Ill.

[73] Assignee: Illinois Tool Works Inc., Chicago, Ill.

[21] Appl. No.: 426,459

[22] Filed: Sep. 29, 1982

Related U.S. Application Data

[63] Continuation-in-part of Ser. No. 316,260, Oct. 29, 1981, which is a continuation-in-part of Ser. No. 276,228, Jun. 22, 1981, abandoned.

[51] Int. Cl.³ ............................ F16B 39/30; F16B 5/02
[52] U.S. Cl. ..................... 411/184; 411/186; 411/311; 411/399; 411/412
[58] Field of Search ...................... 411/116–118, 411/131–135, 145, 146, 166, 173, 174, 176, 180, 411/184–189, 308–311, 378, 394, 398, 399, 411–416, 411/423, 424, 426

[56] References Cited

U.S. PATENT DOCUMENTS

| | | | |
|---|---|---|---|
| 205,990 | 7/1878 | Armstrong | 411/413 |
| 388,000 | 9/1888 | Rider | 411/399 |
| 586,232 | 7/1897 | English | 411/423 |
| 1,238,636 | 8/1917 | Christofferson | 411/399 |
| 1,749,903 | 3/1930 | Cannon | 411/413 |
| 1,802,668 | 4/1931 | Newton | 411/412 |
| 1,953,305 | 4/1934 | MacLean | 411/399 |
| 1,969,796 | 8/1934 | Hoke | 411/424 |
| 2,346,835 | 4/1944 | Green | 411/414 |
| 2,833,326 | 5/1958 | Knohl | 411/185 |
| 3,124,408 | 3/1964 | Oestereicher | 411/415 |
| 3,177,755 | 4/1965 | Kahn | 411/415 |
| 3,247,752 | 4/1966 | Greenleaf et al. | 411/542 |
| 3,286,579 | 11/1966 | Lovisek | 411/386 |
| 3,322,019 | 5/1967 | Lovisek | 411/414 |
| 3,661,046 | 5/1972 | Wand et al. | 411/369 |
| 3,812,639 | 5/1974 | Sygnator | 411/311 |
| 3,856,065 | 12/1974 | Gehring | 411/302 |
| 3,982,575 | 9/1976 | Ollis, Jr. et al. | 411/310 |
| 4,094,352 | 6/1978 | Hlinsky | 411/185 |

Primary Examiner—Thomas J. Holko
Assistant Examiner—Neill Wilson
Attorney, Agent, or Firm—David I. Roche; T. W. Buckman

[57] ABSTRACT

A rotary fastener for use in attaching sheet metal or attaching articles to sheet metal. The fastener has a serrated helical ramp forged in the undersurface of the head during the heading operation. The serrations have generally radially oriented surfaces which engage workpiece material to increase strip torque, removal torque or both. The ramp advances helically in an axial direction and the ramp is spiral in cross-section.

19 Claims, 16 Drawing Figures

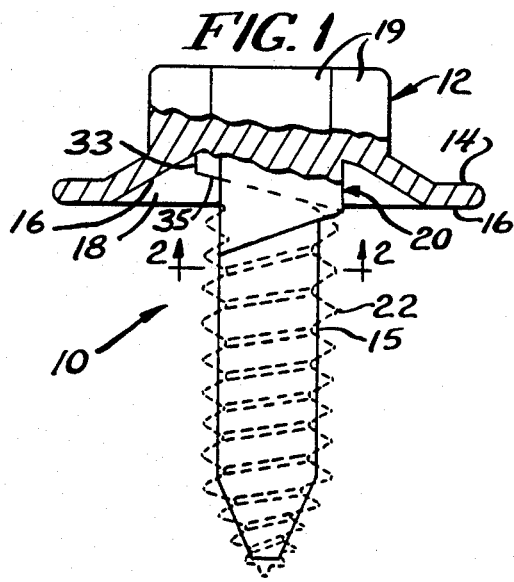
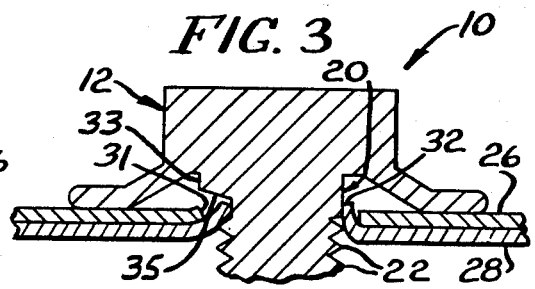
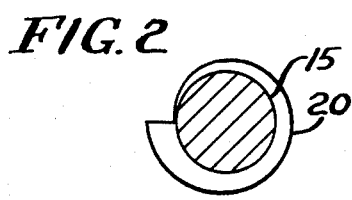
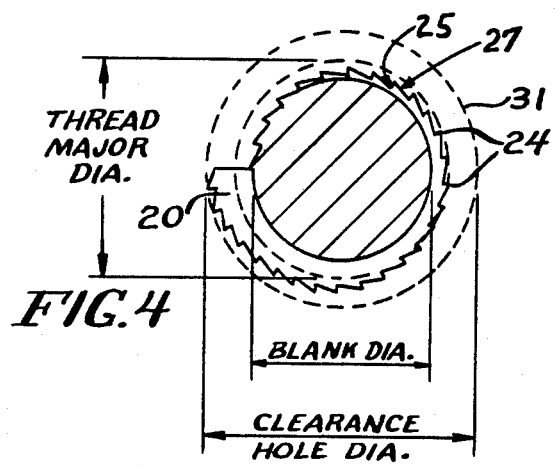
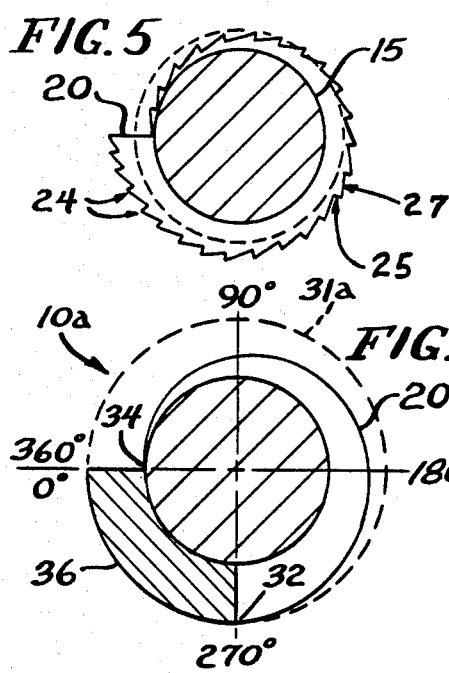
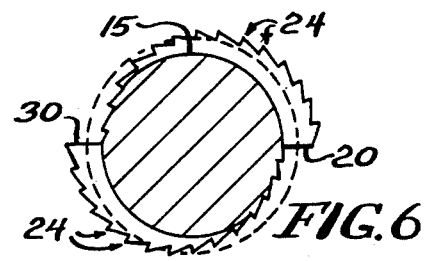
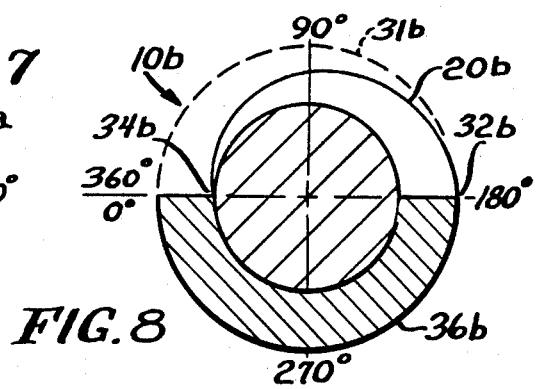

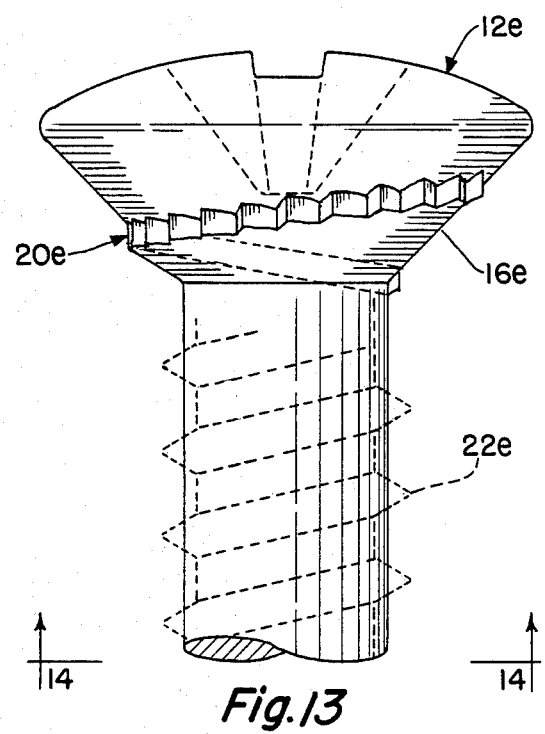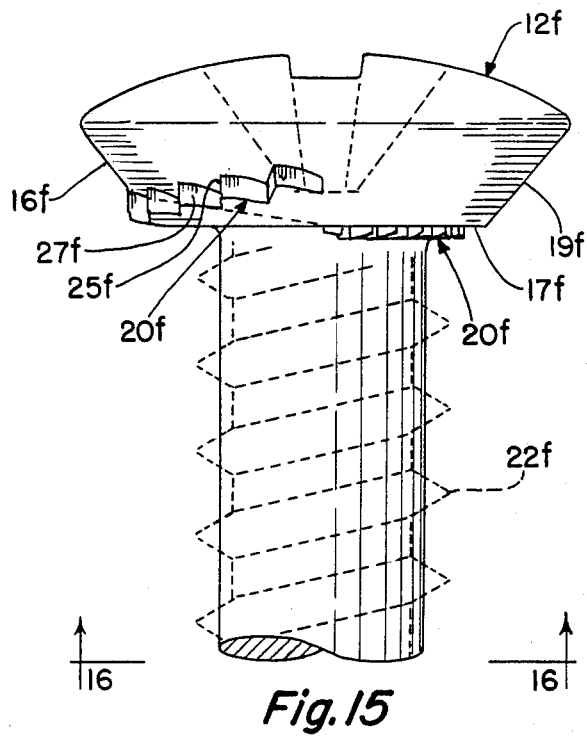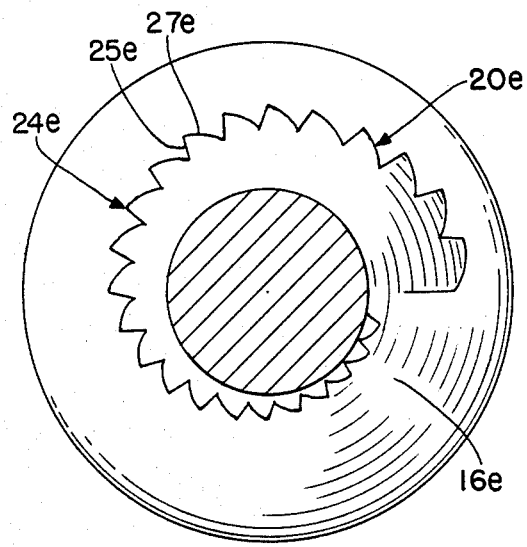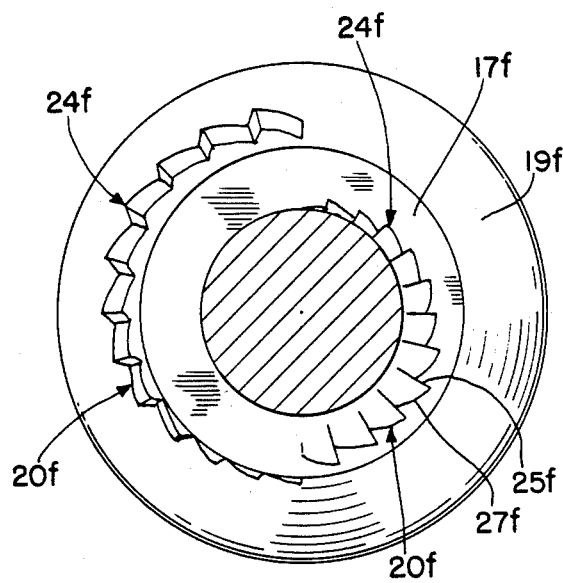

4,516,893

SHEET METAL SCREW

BACKGROUND AND A BRIEF DESCRIPTION OF THE INVENTION

This application is a continuation-in-part of my now pending application Ser. No. 316,260 filed Oct. 29, 1981, which is a continuation-in-part of my now abandoned application Ser. No. 276,228 filed June 22, 1981 abandoned.

The present invention is directed to a sheet metal screw. More particularly, the present invention is directed to a screw for attaching two thin panels together, which screw will exhibit increased stripping torque over other known sheet metal screws.

With currently available sheet metal screws, there is but a very small torque range between drive torque and strip torque. Thus, it is virtually impossible, given dimensional tolerances and variances in materials, to find a single torque setting on power screw drivers which will drive the hardest-to-drive screw without stripping the most strippable. This means a comparatively high number of screws will be stripped which results in reduced clamp load or requires substantial operator time for removal and replacement.

The screw of the present invention reduces the abovestated problem by increasing the size of the range between drive and strip torque. The sheet metal screw of the present invention has a recess in the lower side of the head surrounding the upper region of the shank. Within this recess and for some distance beyond, the shank has formed thereon a helical ramp which may form an extension of the thread on the shank. This ramp can readily be formed during the heading process. The ramp preferably has teeth formed thereon which further increase stripping torque or increase backout resistance depending on the orientation of these teeth.

Other characteristics, features and advantages of the present invention will become apparent after a reading of the following specification.

BRIEF DESCRIPTION OF THE DRAWINGS

FIG. 1 is an enlarged side view in partial section of the head region of the sheet metal screw blank used to form the screw of the present invention;

FIG. 2 is a lateral cross-sectional view of the screw blank shown in FIG. 1 as seen along line 2—2;

FIG. 3 is a side view in partial section showing the screw of the present invention in operative engagement with two sheet metal panels;

FIG. 4 is a lateral cross-sectional view similar to FIG. 2 showing the helical ramp with strip-torque-increasing teeth;

FIG. 5 is a lateral cross-sectional view similar to FIG. 2 showing the helical ramp with backout-resistant teeth;

FIG. 6 is a lateral cross-sectional view similar to FIG. 2 showing first and second helical ramps.

FIG. 7 is a somewhat schematic view of a modification of the invention with variation in the ramp;

FIG. 8 is a view similar to FIG. 7 showing another modification with a further modification of the ramp;

FIG. 13 is a side view of an oval head screw blank used to make a screw of the present invention;

FIG. 14 is a lateral cross-sectional view of the screw blank shown in FIG. 13 as seen along line 14—14;

FIG. 15 is an undercut oval head screw blank used to form a screw of the present invention; and FIG. 16 is a lateral cross-sectional view of the screw blank shown in FIG. 13 as seen along line 16—16.

DETAILED DESCRIPTION OF THE PRESENT INVENTION

Figure 9:
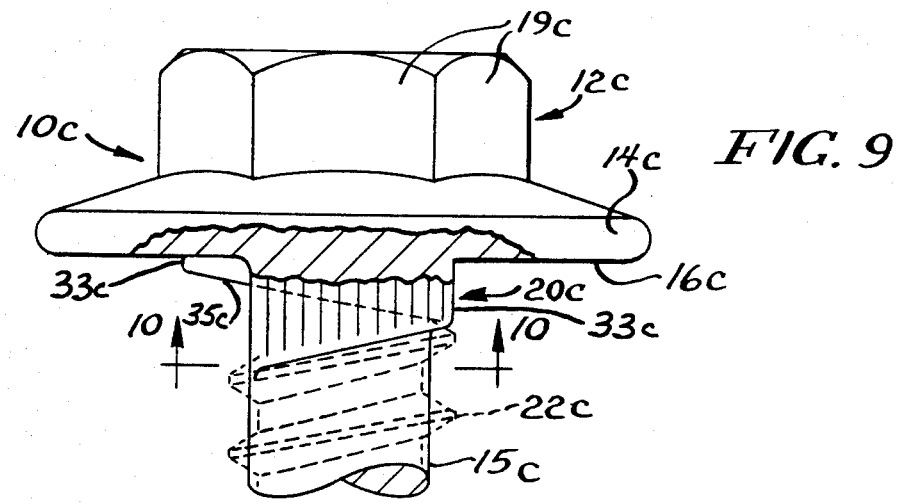
FIG. 9 is a fragmentary view generally similar to FIG. 1 and showing another modification of the invention.
Figure 10:
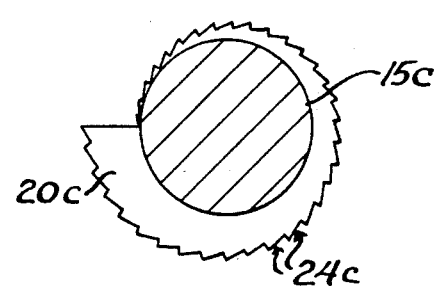
FIG. 10 is a cross-sectional view taken substantially on the the line 10—10 in FIG. 9.
Figure 11:
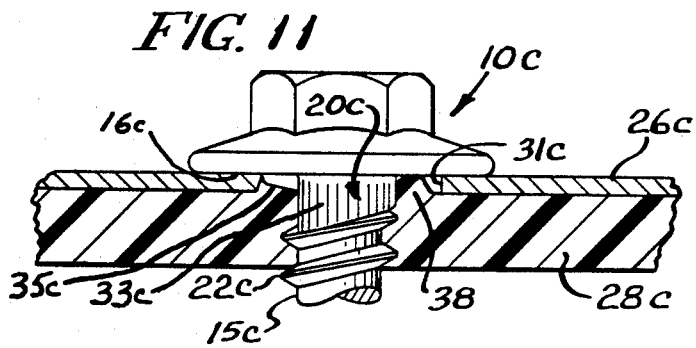
FIG. 11 is a fragmentary view partially in section showing the screw of FIG. 9 with a metal bearing panel and a plastic second panel.

The rotary fastener or, sheet metal screw, of the present invention is shown generally at 10. Head 12 has a flange 14 which extends laterally from a generally cylindrical shank 15. The lower side 16 of head 12 is undercut forming a recess 18. The upper side of head 12 has drive inducing surfaces 19 thereon. A helical ramp 20 extends from a point outside the recess 18 upwardly into the recess. Threads 22 shown in phantom in FIG. 1, will extend laterally about shank 15 such that helical ramp 20 will form a continuation thereof. The thread 22 will be formed partially from the lower extremity of the ramp and, since the ramp exceeds the blank diameter of the shank, additional material is provided to insure fuller thread formation in this region. In conventional sheet metal screws, this upper thread tends to be only partially formed due to the fact that the thread rolling dies cannot reach into the recess and can, therefore, only gather material from one side of the upper thread.

The ramp 20 is comprised of an axial face portion 33 facing radially outwardly such that planes tangent to the face portion are generally parallel to the axis of the screw. The face surface 33 is bounded on its upper side by the under surface 16 of the screw head 12 and by a runner surface 35 on its lower side. The runner surface 35 extends from its intersection with the face surface 33 radially inwardly to the shank of the screw. The teeth 24 are comprised of a generally radially oriented surface 25 and a generally circumferentially oriented surface 27.

It should be noted that the axial length of the face surface 35 of the ramp decreases as it approaches the under surface 16 of the screw. At the same time, the radial distance between the axis of the screw and the face surface 35 increases as the ramp extends between the thread 22 and the under surface 16. The radial extent of the ramp is initially significantly less than that of the thread crest at its beginning point adjacent the thread. However, adjacent the under surface 16, the ramp has a radial extent significantly greater than the thread crest. This is possible because the ramp is formed during a heading operation as opposed to thread rolling operation. The simultaneously spiralling and tapering face portion engages workpiece material to increase the amount of torque required to strip or remove the screw.

This helical ramp 20 is preferably formed during heading and can be provided with whatever configuration desired. For example, the ramp 20 may be serrated so as to have teeth 24 which point in the same direction as the screw's rotational direction (FIG. 4) or opposite to that rotational direction (FIG. 5). Teeth 24 will, then, increase stripping torque or backout resistance, respectively. A second helical ramp 30 (FIG. 6) may be provided which can have teeth 24 which project in a direction opposite to those of ramp 20 so as to provide both increased strip torque and backout resistance.

In operation, as best shown in FIG. 3, screw 10 attaches a first or bearing panel 26 to a second or tapping panel 28. The first panel 26 may typically be provided with a clearance hole 31 which has a dimension exceeding that of threads 22. As the screw 10 reaches its fully seated position where the material of the second panel 28 would ordinarily strip out, the inner edge 32 is instead brought into engagement with helical ramp 20. As the edge 32 climbs higher on ramp 20, the diameter of the ramp and, accordingly, the magnitude of the stripping torque for the screw, increases. As shown in FIG. 4, helical ramp 20 may be so dimensioned as to engage (and in the case of the toothed ramp), bite into the inner edge of clearance hole 31. This will further increase the value for the strip torque.

By the way of example, the helical ramp preferably has a length equal to one and one-quarter times the thread pitch. One-half of a pitch is preferably within the confines of recess 18 with the remaining three-quarters pitch length extending beyond the recess to form the linkup with thread 22. The minimum height of the helical ramp 20 will be the blank root diameter which approximates the diameter of the root of the thread. The maximum height of the ramp 20 (as measured from the root diameter) will be at least equal to the thread crest height (the thread crest diameter less than the root diameter). Preferably, the ramp has a maximum height which is generally twice that of the thread crest height.

Tests indicate that the screw of the present invention has strip torque values significantly greater than either conventional sheet metal screws or screws provided with a recess beneath the head but, having only a cylindrical unthreaded region instead of the ramp. In fact, this latter screw produces no increased strip torque values over other conventional sheet metal screws. This is not surprising, since this recessed screw is not intended to increase strip torque. In fact, this screw is intended to strip the threads in the tapping panel in order to prevent removal. Such a screw can only be effectively used with specific panel thicknesses. If the two panel thicknesses vary from this specific dimension, the screw will fail to produce the desired anti-removal results or will have a significantly reduced clamp load. The screw of the present invention can, on the other hand, be used with a range of different panel thicknesses.

In the preceeding forms of the invention the helical ramp has been of constantly increasing diameter, starting from its inception to its outer extremity. Contact with the clearance hole in the first or bearing panel thus is only with the outer extremity of the ramp, i.e. an essentially point contact. A modification of the invention is shown in FIG. 7 in which the ramp is of limited arcuate extent with a further circumferential portion forming a continuation of the ramp which provides a larger area contact with the clearance hole. With specific reference to FIG. 7 wherein similar parts are identified by similar numerals with the addition of the suffix a there will be seen a screw 10a in which the ramp 20a (the teeth being omitted for simplicity of illustration) extends over 270° of arc, reaching its maximum radial dimension at point 32 which is 270° from the 0° starting point 34. The remaining 90° forms a continuation 36 of the ramp which is of constant diameter, thereby providing approximately 90° of contact with the clearance hole. This has some value in applying stopping torque to the screw, in resisting withdrawal, and in preventing relative movement of the two plates transversely of the screw.

A further embodiment of the invention is shown in FIG. 8 in which similar parts are identified by similar numerals with the addition of the suffix b. In this instance the rising portion of the ramp 20b extends from the 0° position to 180°, i.e. from point 34b to point 32b. The constant diameter extended portion 36b thus extends through 180°, presenting an even greater area of engagement with the edge of the clearance hole than in FIG. 7.

The embodiments of the invention as heretofore shown and described are particularly advantageous for securing together thin pieces of sheet metal. It is sometimes desired to secure together adjacent sheets of thin sheet metal and heavier guage sheet plastic material. A screw particularly adapted to this purpose is shown in FIGS. 9-12, wherein similar numerals again are utilized to identify similar parts, this time with the addition of the suffix c. The essential difference in the present embodiment of the invention is that the lower side 15c of the head is flat with the exception of the shank 16c and the ramp 20c. When the screw of FIG. 9 is passed through the clearance hole 31c in a thin metal bearing plate 26c and screwed through a plastic second or tapping plate 28c a certain amount of the plastic is forced or extruded 38 into the clearance hole 31c by the ramp 20c, and impinges against the flat underside 16c of the head. If the head were recessed as in FIGS. 1 and 3 it is probable that the extruded plastic portion would simply be torn away from the plastic tapping plate, whereby the present screw provides a better stopping torque to stall the screw when driven home by a pneumatic screw driver.

Figure 12:
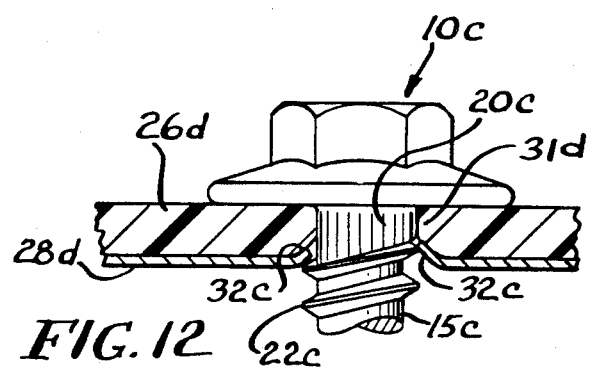
FIG. 12 is a view similar to FIG. 11, but with a plastic bearing panel and a metal second panel.

When the plates are reversed as shown in FIG. 12 with a plastic bearing plate 26d on top and a thinner sheet metal tapping plate 28d on the bottom the clearance hole 31d is larger than the thread crest diameter and the plastic material is simply compressed by the ramp 20c. However, some of the metal surrounding the tapping hole in the tapping plate 28d is deflected upwardly at 32c by the screw threads 22c, and part thereof is engaged by the ramp 20c to aid in stalling the screw and pneumatic driver.

Actual test results with the configuration of FIG. 12 indicate that the stall torque is nearly six times the driving torque, whereby the sheet metal screw and the driver are readily stalled. The stalled torque is nearly twice that of a conventional "AB" screw without the ramp provided in accordance with the present invention.

Another embodiment of the invention is shown in FIGS. 13 and 14 wherein similar numerals are again utilized to identify similar parts. In FIGS. 13 and 14 the suffix e is used to distinguish from previously discussed embodiments. In this embodiment the lower side of the head 16e is beveled in a manner typical of oval head screws. The ramp 20e is formed on the beveled underside 16e. In this particular configuration the ramp 20e increases in radial dimension as it approaches the upper side of the head 12e.

Yet another embodiment of the invention is shown in FIGS. 15 and 16. The suffix f is used in these figures to distinguish from similar parts of other embodiments. FIG. 15 is a profile view of an undercut oval head screw. The underside 16f of the screw shown in FIG. 15 has a substantially flat portion 17f and a beveled portion 19f. The ramp 20f begins on the flat portion 17f and then increases in radial dimension as it approaches the beveled portion 19f. The ram then continues on the beveled portion 19f where it also increases in radial dimension as it approaches the upper side of the head 12f. The ramp 20f has teeth 24f thereon. The teeth 24f are formed such that they have a plurality of edges. The teeth 24f have a first edge 25f which is substantially parallel to the axis of the screw. A second edge 27f is substantially perpendicular to the axis of the screw. It should be noted that the ramp 20f could be disposed only on the beveled portion 19f of the undersurface 16f.

In the embodiments shown in FIGS. 13–16 the helical ramp and the thread of the screw are right handed. It should also be noted that, while the flat portion 17f of the undercut oval head screw is shown substantially perpendicular to the axis of the screw in FIG. 15, the under surface of the screw could be comprised of a variety of compound surfaces. And, a helical ramp in such situations could be disposed on some or all of those surfaces without departing from the spirit and scope of the present invention.

While the present invention has been described in accordance with specific embodiments, various changes, alterations and modifications will become apparent following a reading of the foregoing specification. For example, while the present invention states that the screw has a "generally cylindrical shank", it is intended that such terminology include such lobular configurations as are now conventional screw forms. Further, although the screw has been depicted as a gimlet pointed screw used with two sheet metal panels of equal thickness, it will be understood that the inventive concept of the present invention can be used on drill screws, with special thread configurations or for attaching a plastic panel to sheet metal or to a second plastic panel. Accordingly, it is intended that all such changes, alterations and modifications as come within the scope of the appended claims be considered part of the present invention.

I claim:

1. A rotary fastener for use in attachment of a first panel with a clearance hole to a second panel, said fastener comprising a generally cylindrical shank, an enlarged head having drive-inducing surfaces on one end of said shank, said head having an under surface, said cylindrical shank having at least one helical thread thereon, said thread extending outwardly for a predetermined height that extends from a thread root diameter to a thread crest diameter, a helical ramp beginning substantially at one termination point of said helical thread and forming a continuation thereof, said ramp extending along the shank to said head under surface, said ramp having a generally axially oriented surface which varies in axial length from one end of said ramp to another, said ramp having a generally radially oriented surface of generally increasing radial dimension from one end of said ramp to another and said ramp radially extending surface having a minimum radial extent at a point where said ramp axially oriented surface is at a maximum length, whereby said helical ramp will deflect outwardly some of the material of at least one of said panels thereby greatly increasing the stripping torque of the screw relative to the panel.

2. A rotary fastener for use in attachment of a first panel with a clearance hole to a second panel, said fastener comprising a shank having an axis, an enlarged head having drive-inducing surfaces on one end of said shank, said head having an under surface, said shank having at least one helical thread thereon, said at least one helical thread extending outwardly from said shank for a predetermined height that extends from a thread root diameter to a thread crest diameter, a ramp adjacent said undersurface said ramp comprising a runner surface generally advancing helically along said shank, said ramp further comprising a face surface, said face surface being adjacent said runner surface and generally parallel to said axis; said face surface establishing a first boundary of said runner surface; a second boundary of said runner surface comprising said shank, said ramp having a radially spiral configuration and said face surface having a taper, said ramp runner surface having a minimum radial extent at a point on said ramp opposite said under surface, said face surface having a maximum axial length at said point of said minimum radial extent of said ramp.

3. A rotary fastener for use in attachment of a first panel with a clearance hole to a second panel, said fastener comprising a generally cylindrical shank, an enlarged head having drive-inducing surfaces on one end of said shank, said head having an under surface which included a beveled portion, at least said cylindrical shank having at least one helical thread thereon, said thread extending outwardly for a predetermined height that extends from a thread root diameter to a thread crest diameter, a helical ramp disposed on said beveled portion, said ramp being of the same hand as said thread, and said ramp having serrations thereon said serrations being comprised of a generally radial surface and a generally circumferential surface, said radial surface facing a rotational direction of motion required to install said screw, whereby said helical ramp will deflect outwardly material of at least one of said panels and said serrations will engage said material.

4. The rotary fastener of claim 1 or 2 wherein said helical ramp has an initial height approximately that of the thread root diameter said height increasing to a maximum height which is at least equal to the thread crest diameter.

5. The rotary fastener of claim 1 or 2 wherein the maximum height of the helical ramp is generally equal to twice the thread crest height.

6. The rotary fastener of claim 1 wherein the helical ramp has a number of serrations thereon, each serration being comprised of a generally radial surface and a generally circumferential surface.

7. The rotary fastener of claim 6 or 2 wherein the radial surface faces a rotational direction of motion required to install the screw, said teeth further increasing stripping torque.

8. The rotary fastener of claim 6 or 2 wherein radial surface faces a rotational direction of motion required to remove the screw, said teeth increasing backout resistance.

9. The rotary fastener of claim 1 or 2 further comprising a second helical ramp beginning at a point which is generally diametrically opposed to the initial point of said first helical ramp.

10. The rotary fastener of claim 1 or 2 wherein the predetermined thread crest height is insufficient to contact the edges of the clearance hole in said first panel.

11. The rotary fastener of claim 1 or 2 wherein the helical ramp has a sufficient height to engage the edges of the clearance hole in said first panel.

12. A rotary fastener as set forth in claim 1 wherein said under surface includes a recess beneath said head, said helical ramp deflecting material of said second panel through said clearance hole up into said recess.

13. A rotary fastener as set forth in claim 1 wherein said under surface is substantially flat and said helical ramp deflects material of at least one of said panels transversely of said shank.

14. A rotary fastener as set forth in claim 1 wherein said helical ramp has an arcuate extent of less than 360° followed by a continuation of substantially constant radius.

15. A rotary fastener as set forth in claim 13 wherein said ramp and said continuation together have an arcuate extent of substantially 360°.

16. A rotary fastener as set forth in claim 14 wherein said ramp has an arcuate extent of substantially 270° and said continuation has an arcuate extent of substantially 90°.

17. A rotary fastener as set forth in claim 14 wherein said ramp has an arcuate extent of substantially 180° and said continuation has an arcuate extent of substantially 180°.

18. A rotary fastener as set forth in claim 1, 3 or 2 wherein said helical ramp has a pitch substantially equal to the pitch of said thread.

19. A rotary threaded fastener for use in attachment of a first panel with a clearance hole to a second panel, said fastener comprising a generally cylindrical shank, an enlarged head having drive inducing surfaces on one end of said shank, said shank having at least one helical thread thereon, said head having an under surface including a first substantially flat portion adjacent said shank and a second beveled portion, a spiral ramp disposed on said under surface, said ramp advancing helically about the axis of said fastener, said ramp having teeth thereon, each of said teeth having two surfaces, a generally radial surface and a generally circumferential surface, said radial surface facing in a direction of motion required to install said fastener, said teeth being oriented to engage material of at least one of said panels upon installation of said fastener whereby stripping torque of said fastener is enhanced.

* * * * *